Dec. 28, 1943. K. C. BUGG 2,338,023
FASTENER
Filed Oct. 25, 1941 3 Sheets-Sheet 1

INVENTOR.
Henly C. Bugg
BY
Atkinson, Hurley, Byrne & Knight

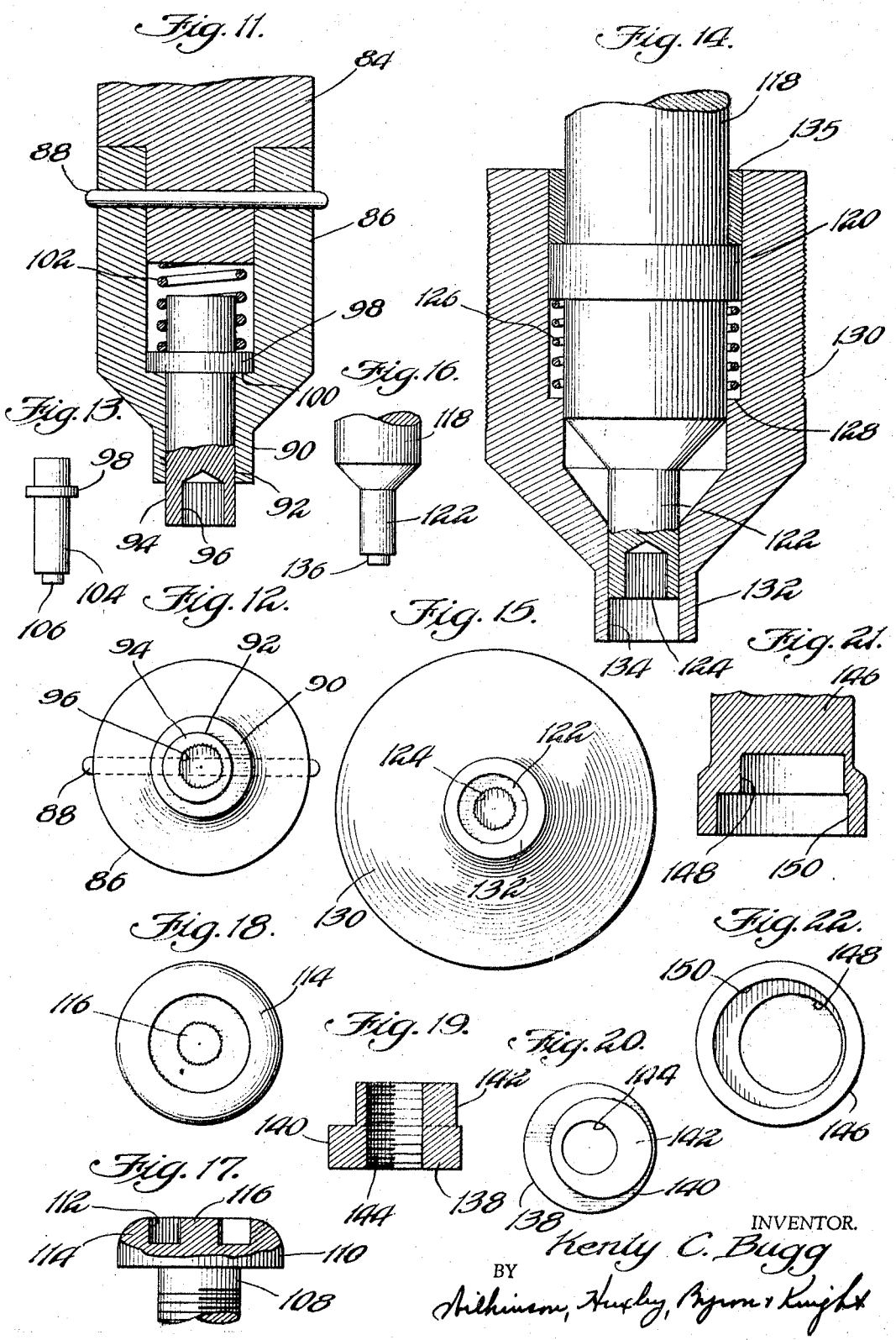

Dec. 28, 1943.      K. C. BUGG      2,338,023
FASTENER
Filed Oct. 25, 1941      3 Sheets-Sheet 3

INVENTOR.
Kenty C. Bugg

Patented Dec. 28, 1943

2,338,023

UNITED STATES PATENT OFFICE 2,338,023

FASTENER

Kenly C. Bugg, Fort Wayne, Ind.

Application October 25, 1941, Serial No. 416,456

8 Claims. (Cl. 85—45)

This invention pertains to hardware, and more particularly to fasteners such as screws, bolts, nuts and the like, and the tools for operating (such as applying or removing) said fasteners.

It is an object of the invention to provide an inexpensive, easily manufactured, decorative fastener and the tools for operating the same, all of which fulfill all requirements of manufacture and service.

It is another object to provide a fastener having a head so constructed and arranged that it may be partially destroyed without rendering the fastener inoperative, the fastener being operative so long as an effective portion thereof, such as a wall, remains in the narrowest part of the head of the fastener.

Still another object is to provide a fastener wherein the head is circular and the operating or purchasing wall thereof is so constructed and arranged that burring is substantially eliminated, even though the fastener be used many times.

Yet another object is to provide a fastener wherein the head is so constructed and arranged that burring is substantially prevented above the topmost plane of the head, and though burring under extraordinary conditions may occur, it will occur laterally rather than axially, whereby no rough or uneven surfaces are exposed.

A further object is to provide a fastener which will readily grip or be gripped by the fastening or driving agent so that the fastener can be handled easily and expeditiously, even though applied with extreme rapidity, and in places normally inaccessible to ordinary fastening means.

A still further object is to provide fastening means and a driver therefor wherein it is substantially impossible for the driver to slip from driving position while said fastening means is being set or fastened.

A yet further object is to provide a fastener and driving means therefor so constructed and arranged, one with respect to the other, that the driver is piloted into a driving or engaging position, which is advantageous in high speed or automatic driving.

Another object is to provide fastening means which may be readily manufactured by a plurality of methods, such as by boring, turning, coining or upsetting.

Another object is to provide fastening means having a head which is so constructed and arranged that it will be of maximum strength, but when the driver is applied thereto, the maximum effective driving faces between the fastening means and the driver are in contact.

Another object is to provide a safety screw which may be so constructed and arranged that it is necessary to use the same type of driver for removal as for application, so that in effect the screw serves as a lock.

Another object is to provide fastening means and a driver therefor, wherein the head of the fastening means may be fashioned so that the means permitting rotation of the fastening means by the driver, and the complementary means of the driver, are always in the same relative position, as there are no parts of the head or driver to be specifically related, one to the other.

Another object is to provide fastener means and driving means therefor, wherein the head of the fastener means is so fashioned that the means permitting rotation of the fastener means by the driving means, and the complementary means of the driving means, are always in the same relative position through 360°.

Another object is to provide fastening means and a driving means therefor, wherein the head of the fastening means may be fashioned so that the means permitting rotation of the fastening means by the driver, and the complementary means of the driver are eccentric, whereby said means have no specific position to be placed circumferentially through 360°, so that only one position of said means of the head and driver need be matched.

Another object is to provide a fastener and a driver therefor, wherein the complementary means between the driver and the fastener are eccentric and, therefore, only one position of said means of the driver and fastener need be matched.

Another object is to provide a fastener and a driver therefor, wherein the complementary means between the driver and the fastener are so constructed and arranged that the body and/or rim portions are substantially circular, and the pilot, priming and/or driving portions are substantiallly circular but eccentrically disposed with respect to the respective body or rim portions.

Another object of the invention is to provide fastening means having the above advantages, wherein means is provided permitting emergency removal of the fastening by existing driver means such as the ordinary screw driver.

With these and various other objects in view, the invention may consist of certain novel features of construction and operation as will be more fullly described and particularly pointed out in the specification, drawings and claims appended hereto.

In the drawings, which illustrate embodiments of the device, and wherein like reference characters are used to designate like parts—

Figure 11 is an enlarged fragmentary sectional elevation through another form of driver wherein there is provided an inner rotatable priming and pilot eccentric, said eccentric being a female;

Figure 12 is a bottom plan view of the driver illustrated in Figure 11;

Figure 13 is an elevation showing a male form of rotatable priming and pilot eccentric, to be used in place of the female form illustrated in Figure 11;

Figure 14 is an enlarged fragmentary sectional elevation of another form of driver having an inner priming and pilot eccentric and an outer relatively rotatable priming and pilot sleeve;

Figure 15 is a bottom plan view of the driver end illustrated in Figure 14;

Figure 16 is a modified form of inner priming and pilot eccentric for use with the form of driver illustrated in Figure 14, wherein the same shows a male type of eccentric for use with a female type of fastener;

Figure 17 is an enlarged fragmentary sectional elevation of a head for a threaded fastener wherein the pilot and priming stud is located on the longitudinal center line of the fastener;

Figure 18 is a top plan view of the head shown in Figure 17;

Figure 19 is an enlarged sectional elevation of an eccentric form of nut embodying the invention;

Figure 20 is a top plan view of the nut shown in Figure 19;

Figure 21 is an enlarged fragmentary sectional elevation of the end of a driver for manipulating the nut illustrated in Figures 19 and 20;

Figure 22 is a bottom plan view of the driver end illustrated in Figure 21;

Figure 1:
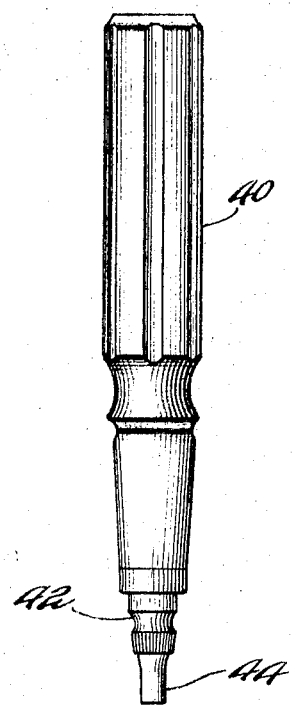
Figure 1 is a side elevation of a driver embodying the invention.
Figure 2:
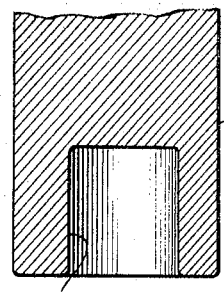
Figure 2 is an enlarged fragmentary sectional elevation through the female fastener engaging end of said driver, the same being taken substantially in the plane as indicated by the line 2—2 of Figure 3.
Figure 3:
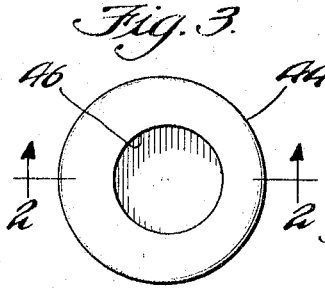
Figure 3 is a bottom plan view of the fastener engaging end of the driver illustrated in Figures 1 and 2, the same looking upwardly as viewed in Figure 1.

Referring first of all more particularly to the female form of driver illustrated in Figures 1, 2 and 3, said driver consists essentially of a handle 40 of any desired shape, having the driving end 42 fixedly secured thereto. The end 42 is provided with a fastener engaging end 44, which end 44 is preferably substantially cylindrical for a distance from its extremity and is provided with a substantially cylindrical recess 46. The outer edge of the end 44 is circular in plan, as is the recess 46, the recess 46, however, being eccentrically disposed with respect to the outer edge of the end 44 (Figures 2 and 3).

Figure 4:
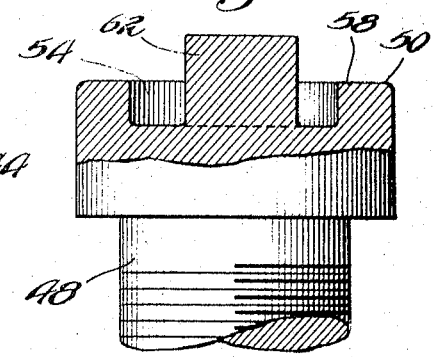
Figure 4 is an enlarged fragmentary sectional elevation showing one form of fastener head embodying the invention, which fastener may be in the form of a bolt, screw, etc.
Figure 5:
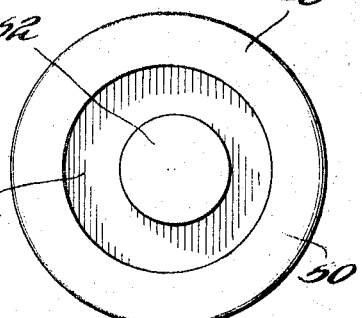
Figure 5 is a top plan view of the head illustrated in Figure 4.
Figure 6:
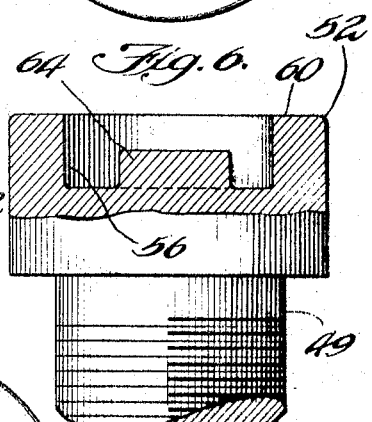
Figure 6 is an enlarged sectional elevation of another form of fastener head embodying the invention.

In the fastening means illustrated in Figures 4, 5 and 6, it is understood, of course, that said means may be either a bolt or a screw wherein the shanks or threaded portions 48 and 49 are provided with the heads or body portions 50 and 52, respectively which are tool engaging portions. Said heads are recessed as at 54 and 56 to provide rims or outer walls 58 and 60, respectively, of substantially constant thickness whereby the recesses 54 and 56 are concentric with the outer edge of the head, i. e., the centers of said recesses are on the longitudinal axes of the fastening means.

Adjacent the center of the head there is provided a projecting pilot and priming member or projection 62 and 64, respectively, the member 62 projecting above the plane of the head 50, whereas the projection 64 terminates below the plane of the head 52. Projections 62 and 64 are substantially cylindrical, and where used with the driver illustrated in Figure 1, the projections 62 and 64 are adapted to fit snugly within the recess 46, and the outer portion of the end 44 is adapted to be received within the rims 58 and 60.

As it is desirable that the outer portion of the end 44 fit within the rims 58 or 60, and the recess 46 receive the member 62 or 64 as quickly and positively as possible, the upper ends of the members 62 and 64 are disposed, respectively above and below the plane of the head in order to facilitate the application of the driver to the heads, i. e., in order that there be a piloting action.

By slightly turning the driver with respect to the head, the pilot and priming member 62 and the priming member 64 cause the thickened portion of the member 44 (Figure 3) to move toward the narrowest portion of the heads, thereby causing a wedging action to hold the fastening member to the driver and/or permit rotation of the fastening member by the driver. Of course, rotation of the driver in a reversed direction causes a wedging action in a reversed direction to permit removal of the fastening member, and it will be seen that so long as any of the rim remains on the heads, unless the narrowest portion is completely destroyed, the fastening member can be applied or removed.

Figure 7:
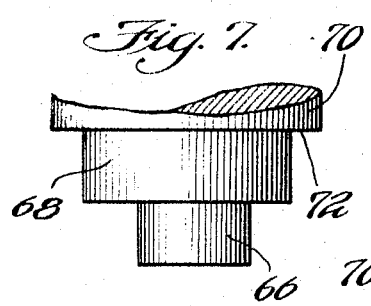
Figure 7 is an enlarged fragmentary side elevation of another form of driver embodying the invention, the same being in male form.
Figure 8:
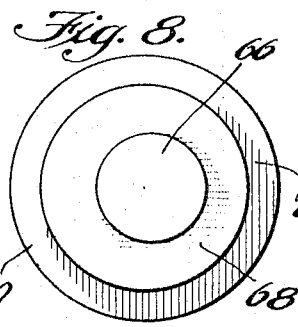
Figure 8 is a bottom plan view of the driver end illustrated in Figure 7.

In the male driver end illustrated in Figures 7 and 8, said end is provided with the substantially cylindrical male pilot member 66 eccentrically disposed with respect to the longitudinal center line of the driver, the male pilot member being disposed adjacent the concentric cylindrical drive member 68. The member 68 is disposed below the shoulder 70 of the driver, said shoulder 70 being provided with the face or plane 72 adapted to engage the top face or plane 74 of the head 76 of the form of fastener shown in Figures 9 and 10.

Figure 9:
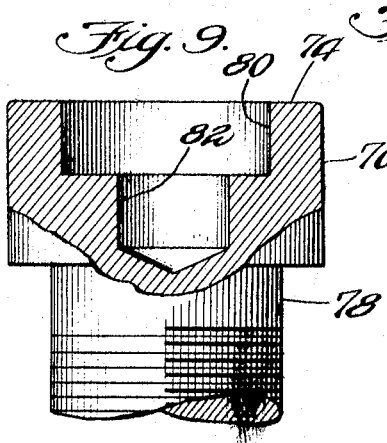
Figure 9 is an enlarged fragmentary sectional elevation of another form of fastener head embodying the invention, the same being adapted to be operated by the driver end illustrated in Figures 7 and 8.
Figure 10:
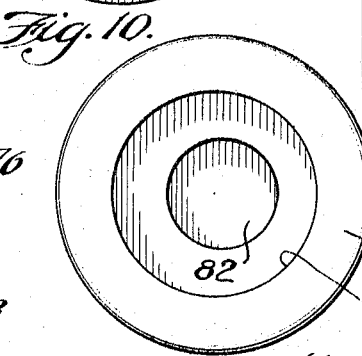
Figure 10 is a top plan view of the fastener head illustrated in Figure 9.

The head or body portion (tool engaging portion) 76 of the fastener shown in Figures 9 and 10 is provided on the shank member 78 with a screw or bolt, and said head is provided with the concentric recess 80, preferably of substantially the same depth as the member 68, for receiving the cylindrical member 68, and said head is provided with the eccentric recess 82 for receiving the male pilot member 66. Thus, when the member 66 is inserted in the recess 82, the member 68 is received in recess 80, the plane 72 abutting the top of the rim 74. Rotating the driver causes rotation of the fastener due to the wedging action caused by the eccentric disposition of the recess 82.

In the driver shown in Figures 11 and 12, the body or handle portion 84 is provided with the outer fixed priming and pilot sleeve 86, secured thereto as at 88. The pilot sleeve 86 is provided with the diminished substantially cylindrical end 90 eccentrically bored as at 92 and receiving the inner rotatable priming and pilot eccentric 94. The eccentric 94 is substantially cylindrical and is provided with the substantially cylindrical recess 96 which may be serrated. The recess 96 is eccentric to the eccentric 94 and is provided with the shoulder 98 adapted to engage the retaining shoulder 100 of the sleeve 86. A spring 102 is disposed between the shoulder 98 and the body portion 84 urging the eccentric outwardly, i. e., toward the position illustrated in Figure 11.

Where a driver of this character is to be used for a head similar to that shown in Figure 9, the priming eccentric 104 illustrated in Figure 13 is used in place of the eccentric 94. Said eccentric 104 is similar to the eccentric 94, being provided with the shoulder 98, but in place of the recess 96, a pilot member 106 is provided for reception within the recess 82, said member 106 being substantially cylindrical and disposed eccentric to the eccentric 104.

In the fastening means shown in Figures 17 and 18, the shank portion 108 of the screw or bolt is provided with the head or body portion (tool engaging portion) 110, said head being recessed as at 112 to provide the concentric rim 114 and the concentric substantially cylindrical pilot and priming stud 116, which may be flush with the plane of the rim or may terminate above or below said plane as shown in Figures 4 and 6.

When it is desired to utilize the driver illustrated in Figures 11 and 12 to apply the fastening means illustrated in Figures 17 and 18, the driver is moved so that the recess 96 receives the stud 116, and movement of the driver 84 toward the head compresses the spring moving eccentric 94 inwardly against the spring until the end 90 is received in the recess 112, whereupon rotated movement of the driver 84 in either direction will rotate said fastener in said direction due to the cam action between stud 116, eccentric 94, end 90 and rim 114, the stud serving to prime the driver end into wedging position with respect to the rim. Of course, a similar action takes place when a driver is used with the eccentric 104 to rotate a bolt or screw having a head similar to that shown in Figure 9.

In the form of driver illustrated in Figures 14 and 15, the driving member 118 to which the handle is fixed, is provided with a shoulder 120, and the cylindrical end 122, the axis of said cylindrical end coinciding with the axis of the driving member 118. The end 122 is provided with the substantially cylindrical eccentric recess 124 which may be serrated. A spring 126 is disposed between the shoulder 120 and the shoulder 128 of the pilot and operating sleeve 130, said sleeve 130 being provided with a cylindrical end 132 provided with the eccentric bore 134 for slidably receiving the end 122. The fastening means 135 is fastened to the sleeve 130 and is adapted to abut the shoulder 120 when the end 122 is in withdrawn position as shown in Figure 14.

Thus, when this type of driver is used with the fastener illustrated in Figures 17 and 18, the member 132 operates as a pilot, being received within the recess 112, and the main driving portion 118 may be rotated if necessary and moved downwardly until the recess 124 receives the stud 116, whereupon continued rotation of the member 118 in either direction will rotate the fastening member. In the event it is desired to use the type of driver illustrated in Figure 14 with the type of head illustrated in Figures 9 and 10, the main driving member 118 is provided with the cylindrical portion 122, and the male eccentric member 136 (Figure 16) is provided adapted to be received within the recess 82 when the member 118 is depressed against the spring 126, the portion 132 of the sleeve having been received in the recess 80. The operating movement is similar to that already described.

Figures 19 and 20 illustrate a circular nut 138 provided with the main body portion 140 and an eccentric circular portion 142, the threads 144 being disposed through portions 140 and 142 and concentric to the portion 140.

In Figures 21 and 22, the driver for the nut 138 is illustarted wherein the driver end 146 is provided with the eccentric recess 148 adapted to receive the eccentric portion 142 of the nut 138. The main recess 150 adjacent the recess 148 is adapted to receive the body portion 140 of said nut, whereby the nut may be rotated in either direction by a camming action.

Figure 23:
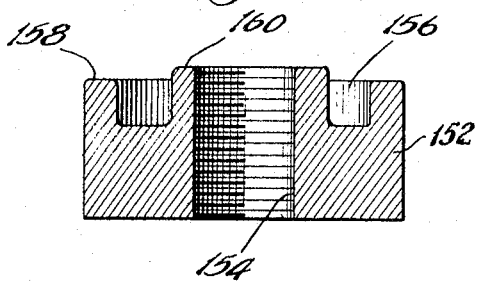
Figure 23 is an enlarged fragmentary sectional elevation showing a modified form of nut adapted to be operated by the driver illustrated in Figures 1, 2 and 3.

Referring to Figure 23, a modified form of nut is provided wherein the cylindrical body portion 152 is provided having the concentric threaded portion 154, the recess 156 being disposed to provide the outer rim 158 of constant thickness. An upstanding eccentric projection 160 is provided and, while the projection 160 is shown in Figure 23 as extended above the plane of the rim 158, it is understood it may extend below said plane in a manner similar to that already shown in Figure 6, and for the same purpose. This type of nut is adapted to be set by the type of driver illustrated in Figures 1, 2 and 3, and in a manner already described for the bolts or screws shown in Figures 4, 5 and 6.

Figure 24:
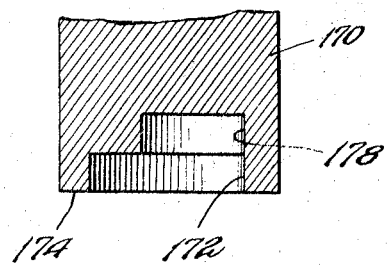
Figure 24 is an enlarged fragmentary sectional elevation of the end of a driver for use with the head of the fastener illustrated in Figure 26.
Figure 26:
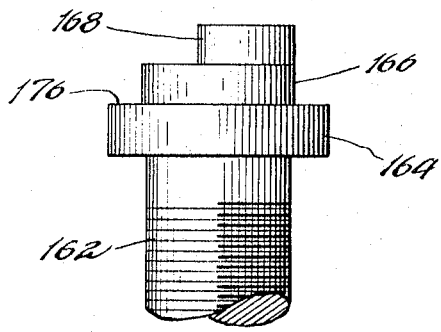
Figure 26 is a modified head of a fastening means such as a screw or bolt.
Figure 25:
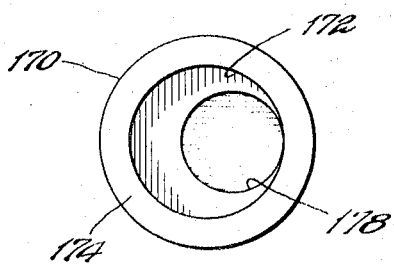
Figure 25 is a bottom plan view of the end of the driver illustrated in Figure 24.
Figure 27:
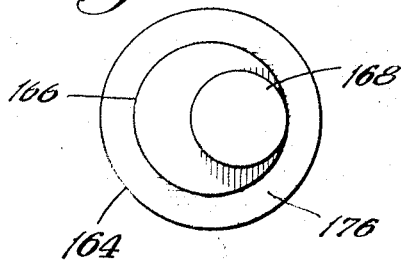
Figure 27 is a top plan view of a head illustrated in Figure 26.

In the bolt or screw illustrated in Figures 26 and 27, the body portion 162 of said bolt or screw is provided with the cylindrical concentric head 164, said head being provided with the cylindrical concentric portion 166 and the eccentric cylindrical portion 168. The driver for said bolt or screw shown in Figures 26 and 27 is illustrated in Figures 24 and 25 wherein the end member 170 of said driver is provided with the concentric cylindrical aperture 172 adapted to receive the cylindrical portion 166 of the head of the bolt or screw, the end plane 174 of said driver abutting the top plane 176 of the cylindrical head 164, the eccentric portion 168 being received in the complementary cylindrical eccentric recess 178 of the driver end 170. Rotation of said head of the bolt or screw may, of course, be had in either direction by the driver illustrated in Figures 24 and 25 through the camming action already described.

Figure 28:
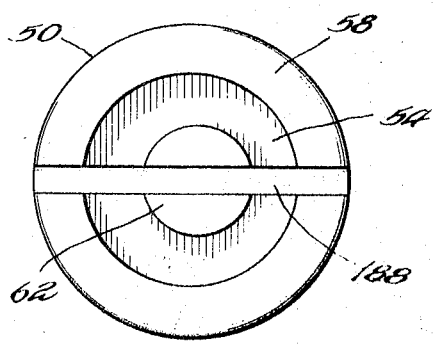
Figure 28 is a top plan view of a form of fastening means, such as illustrated in Figures 4 or 6, wherein a slot is provided for removal of the fastening means as by an ordinary screw driver.

In Figure 28 the form of head illustrated in Figure 4 is shown. In this construction the head 50 is provided with a rim 58, the projection of stud 62 and the recess 54. But in this form a slot 188 is provided extending diametrically of the head. This slot is used merely for emergency removal or application of the fastener by an ordinary screw driver, as the other forms of drivers illustrated herein are preferred for the reasons such as set forth in the objects herein. While the form of head illustrated in Figure 4 is modified as shown in Figure 28, it is of course understood that this emergency slot may be applied to the other forms of fastening means described herein. This slot is made possible as the screw or bolt heads shown herein are operative even though a portion of the rim or stud is removed.

The forms of fasteners and drivers illustrated are very inexpensive to make, and they are of a priming nature whereby the fasteners can be applied to the driver end, and thus out of the way places may be readily reached. The priming is positive, and slippage of the driver from the head is minimized whereby the adjacent work or material is not likely to be damaged, and the drivers and fasteners are long lived as there is little danger of burring or destruction. The fasteners and drivers are readily adapted to automatic or powed driven tools. Further, while on some of the modifications herein shown a distinct head is shown, it is understood this is not always necessary as the tool engaging surfaces, projections, recesses, etc., may be disposed at the end of a threaded shank, or the head may be of the same diameter as the shank, or may encompass the threads (as in a nut), but for the sake of this application the head may be termed that portion having the tool engaging means.

It is to be understood that I do not wish to be limited by the exact embodiments of the device shown, which are merely by way of illustration and not limitation, as various other forms of the device will of course be apparent to those skilled in the art without departing from the spirit of the invention or the scope of the claims.

I claim:

1. A fastener device comprising a tool engaging portion having fastening means, said portion being provided with a substantially circular cylindrical recess providing a tool engaging surface concentric with said fastening means, said tool engaging portion having a substantially circular cylindrical projection disposed in said recess and located eccentrically with respect to said fastening means, said cylindrical projection providing a tool engaging surface.

2. A fastener having a tool engaging portion provided with fastening means, said portion having a substantially circular tool engaging surface, the axis of which extends in substantially the same direction as the axis of said fastening means, and an eccentric projection provided on said tool engaging portion having a substantially circular cylindrical tool engaging surface, the axis of said projection extending in the same direction as the axis of said fastening means.

3. A fastener device comprising a head and fastening means, said head being provided with a substantially circular cylindrical recess providing an inner tool engaging surface concentric with said fastening means, and means disposed within said recess having a circular cylindrical tool engaging surface concentric with said first named tool engaging surface.

4. A fastener having a tool engaging portion and fastening means, said portion having a circular recess therein defining a rim and an inner tool engaging surface concentric with said fastening means, and a fixed circular eccentric projection disposed in said recess spaced from said rim and providing a tool engaging surface.

5. A fastener having a tool engaging portion and fastening means, said portion having a circular recess therein defining a rim and an inner tool engaging surface concentric with said fastening means, and a fixed eccentric circular projection disposed in said recess and spaced from said rim, said projection terminating below the level of said rim.

6. A fastener having a tool engaging portion and fastening means, said portion having a circular recess therein defining a rim and an inner tool engaging surface concentric with said fastening means, and a fixed circular projection disposed in said recess spaced from said rim and providing a tool engaging surface.

7. A fastener having a tool engaging portion and fastening means, said portion having a circular recess therein defining a rim and an inner tool engaging surface concentric with said fastening means, and a fixed circular eccentric projection disposed in said recess and spaced from said rim, said projection extending above the level of said rim.

8. A fastener having a tool engaging portion and fastening means, said portion having a circular cylindrical tool engaging surface concentric with said fastening means, and a fixed circular eccentric projection providing a tool engaging surface adjacent said first named tool engaging surface.

KENLY C. BUGG.